3,021,218
PRODUCING A STABLE COFFEE AROMA PRODUCT
William P. Clinton, Morris Plains, N.J., and Esra Pitchon, Flushing, N.Y., assignors to General Foods Corporation, White Plains, N.Y., a corporation of Delaware
No Drawing. Filed Jan. 21, 1959, Ser. No. 788,033
13 Claims. (Cl. 99—71)

This invention relates to an aromatized soluble coffee product, and more particularly to a process for aromatizing the headspace of a jar of soluble coffee to provide an improved article of commerce. This is a continuation-in-part of U.S. Serial No. 463,038, filed October 18, 1954, now abandoned, and U.S. 698,927, filed November 26, 1957, now abandoned.

Heretofore, many attempts have been made to produce a dry extract of roasted coffee which when dissolved in hot water will provide a beverage identical with freshly brewed coffee. These efforts have largely been in the direction of extracting ground roasted coffee with a solvent to obtain an extract similar to that obtained by conventional coffee brewing. In addition well known methods of collecting volatile aroma and flavor constituents for recombining them with the liquid extract have also been employed and the extracts are subsequently dried to powder form. Unfortunately, such attempts at providing acceptable cup coffee from dry coffee extracts do not have the corresponding advantage of an enhanced aroma in the powdered or dried product.

Dry coffee extracts as presently marketed are either practically odorless or else do not provide an aroma reminiscent of freshly roasted coffee. This character of dry coffee extracts has been a major factor in consumer resistance to such products. When a container of ground roasted coffee is opened, the surrounding atmosphere is permeated with the pleasing aroma of the freshly ground coffee. This incidental feature to the use of regular coffee is one which the consumer looks forward to and which has been lacking in the past in the case of containers of dry coffee extracts.

Furthermore, present day dry coffee extracts, whether simply dried water extracts of coffee, or extracts fortified by the addition of artificial or natural coffee aroma, are subject to some amount of flavor deterioration during storage. In the case of the simple dried extract, storage under normal conditions in a sealed container for the period of a year even at 30° C. will result in a significant loss of flavor and, in some cases, the development of an aroma in the container resembling that of acetic acid. Also, fortified dry coffee extracts produced either by addition of aroma constituents to the liquid extracts prior to drying, or by contact with and absorption on dry powder, while perhaps possessing a high initial flavor level, often suffer loss or deterioration of flavor under usual storage conditions.

Accordingly, a primary object of this invention is to provide a filled container of dry coffee extract or coffee substitute which at the time of use will provide the consumer with the aroma of freshly ground roasted coffee.

Another object of this invention is to provide a soluble coffee product packaged so as to prevent deterioration of the desired flavor and aroma principles for cup coffee during storage.

It has now been found that the acceptability of a soluble dry coffee product is greatly enhanced and that the sensation experienced in opening a container of freshly ground roasted coffee is substantially duplicated by the packaging of such dry extracts in an atmosphere of coffee aroma-gas supplied by vaporizing a coffee aroma condensate and introducing it into the void space of a filled vacuumized container of soluble extract. Preferably, an atmosphere of highly concentrated natural coffee aroma is employed and is introduced by elevating the temperature of a previously collected coffee aroma condensate frost whereby the more volatile coffee aroma constituents are admitted in a concentrated form to the void space of a container previously filled with the dry extract while undesirable moisture, undesirable aroma components and trapped oxygen are occluded in the condensate residuum. By this process a sealed container of soluble coffee powder is provided with an aroma which affords substantially the same pleasant coffee aroma as when a container of regular ground roasted coffee is opened. Advantageously, the resulting packaged soluble coffee product is accompanied by unexpectedly and distinctly improved storage stability of desired flavor and aroma principles for cup coffee.

Dry coffee extracts can be obtained by any of a number of well known procedures. Hot or cold water extractions of ground roasted coffee followed by drying of the extract to provide a dry soluble product is the usual manner in which these materials are produced. Dry coffee extracts which have been improved by the addition of flavoring principles to the dry extracts or in the course of preparing the extracts such as those described in U.S. Patent No. 1,367,725 to Charles F. Trigg; U.S. Patent No. 1,392,045 to J. W. Scott; and 2,542,119 to H. Cole are also enhanced by the aromatization process described herein. Furthermore, coffee substitutes prepared by roasting previously treated cereals such as wheat, rye, barley, and the like, processed to be provided in the form of an extract or other solubilized product, are greatly enhanced according to the present invention in that the consumer is afforded the sensation of an aromatized package of the product on container opening. One such product, marketed under the trademark "Instant Postum" is a dried water extract of roasted wheat, barley and molasses. Accordingly, the term "soluble coffee product" as employed in the claims hereinafter is to be understood as including both dry coffee extracts and coffee substitutes.

The aroma employed according to the present invention may be one or more natural aromas obtained at any one of several points in the processing of coffee and, if desired, an artificial type of aroma may also be employed. Of the natural types of aroma, that which is released during the process of grinding freshly roasted coffee beans is preferred. Another type of aroma which may be employed in the present invention is that which is collected at sub-zero temperatures after distillation of the roasted coffee beans, preferably a dry or substantially dry distillation such as that described in U.S. Patent No. 2,680,687 to Lemonnier. The gases evolved during roasting of green coffee, termed "roaster gases," and those distillable from infusions or water extracts of ground roasted coffee, termed "infusion aroma," may also be employed, but in general these materials are somewhat harsh in character and are less preferred.

The general procedure which may be followed in packaging the dry coffee extract involves filling a glass jar or other container with the powdered extract and evacuating the air from the container and its contents. It has been found that a vacuum of about 29.5 inches of mercury at standard conditions of temperature and pressure when applied to said container and its contents will provide a satisfactory removal of air. The void in the container is then replaced with the desired type of coffee aroma in the appropriate amount in the manner specified herein, after which the container is sealed.

The process of the invention can best be illustrated by reference to grinder gas which is released during grinding of roasted coffee beans. This gas also continues to evolve from the fractured beans for a short period after grinding and has a very pleasing aroma somewhat similar to the aroma sensation experienced in drinking a cup of freshly brewed coffee. Ordinarily, in the process of roasting and grinding coffee this aroma is largely lost to the atmosphere and thus its recovery and utilization represents an economy of operation not heretofore achieved. The chemical composition of this gas is largely carbon dioxide together with a small amount of water vapor and the characteristic aromatic constituents of roasted coffee.

In the collection step the grinding equipment is enclosed and the gases liberated from the ground coffee are removed by means of a rotary blower connected to the system by appropriate piping. Where desired, a stream of inert gas such as nitrogen may be used to sweep the gas from the coffee so that the grinding operation takes place in a substantially inert atmosphere. Such a process is described in the Wendt patent, U.S. 2,156,212, describing a method of collection of the gases evolved during roasting, which can be equally well applied to collection of grinder gases. However, even when such precautions are taken to maintain an inert atmosphere, some air containing oxygen is always present.

The aroma gases recovered in this manner are collected and condensed at very low temperatures. As the temperature of condensation is lowered the quality and quantity of the aroma collected progressively improves. A temperature around $-195°$ C., the temperature of liquid nitrogen, is the lowest practical temperature which can be obtained and accordingly is preferred. The aroma is collected as a frost at temperatures of about $-195°$ C., tempered to about $-78°$ C. after collection, and then permitted to warm so as to vaporize the desirable aromatic components. The frost which is collected at about $-195°$ C. contains, in addition to the desirable aromatic components, carbon dioxide, moisture, air containing oxygen, and undesirable aromatic components. During tempering of the frost or storage at about $-78°$ C., the oxygen in the air which was liquefied at $-195°$ C. vaporizes as the temperature is raised from $-195°$ C. to $-78°$ C. At about $-78°$ C. the carbon dioxide sublimes to form a gas. The carbon dioxide, a natural component of grinder gas, is present in sufficient quantity to purge the frost environment of air containing undesirable oxygen so that the frost is maintained under a carbon dioxide blanket, the air and some of the carbon dioxide being vented to the atmosphere. Further warming of the frost to a still higher temperature permits the vaporization of the desirable aromatic components while the moisture, trapped oxygen and undesirable aromatic components remain behind in the liquid condensate residuum. The liquid condensate residuum containing the undesirable aromatic components becomes unstable after a period of 1-12 hours even when stored under an atmosphere of an inert gas as evidenced by its highly obnoxious odor which is reminiscent of shunk musk or rotten onions and its color change. The desirable aromatic principles when stored under an atmosphere of an inert gas such as carbon dioxide remains stable for periods in excess of six months. The above treatment permits only substantially moisture and oxygen free, desirable aromatic components and carbon dioxide to enter the container of soluble coffee powder. Thus, all of the undesirable components of the grinder gas or its environment are excluded prior to its introduction into the headspace of a jar containing soluble coffee powder.

Aroma condensed in this manner is in the form of a frost or snow-like material and may be easily handled provided a temperature of about $-75°$ C. is maintained. Good results may also be obtained with temperatures of $-78°$ C. or less if the gases are substantially free of oxygen, although the yield of aroma constituents is somewhat lower in this case.

The fraction of grinder gas frost which vaporizes above about $-78°$ C. is then introduced into a container filled with soluble coffee extract. Air is removed from the filled container by application of a vacuum, the degree of vacuum applied regulating the amount of aroma subsequently introduced. The evacuated filled container is then released to an atmosphere of concentrated grinder gas provided by causing the desirable aromatic principles of the frost to vaporize in its container by the application of a slight amount of heat sufficient to obtain a temperature of not more than 70° C. and ideally room temperature (25° C.) and generally above $-10°$ C. and thereafter admitting the vapor to the evacuated coffee container. If desired, a small amount of positive pressure, due either to an excess quantity of grinder gas or a lowered packaging temperature, may be induced in order to provide an initial burst of aroma when the container is first opened by the consumer. The container is then sealed and is ready for marketing.

The concentration of grinder gas found in the container voids at the conclusion of this process should preferably be from 30-100% in the void space in the filled container. Satisfactory results are obtained with concentrations of grinder gas of the order of 10% of the atmosphere in the container, but at such lower concentrations aroma released on opening the container is correspondingly less and not perceptible. Accordingly, a concentration of from 30-100% is preferred. This amount may be regulated by varying the degree of vacuum created in the container during packaging. Under the conditions described, a vacuum of 29.5 inches of mercury at standard conditions affords 95% and still higher grinder gas concentrations in the container depending upon the case employed in aromatization while a vacuum of 15 inches of mercury results in about 30% grinder gas concentration.

As a specific example of the process of this invention, grinder gas is collected from a regular production line coffee grinding operation. The main source of aroma is the grinding rolls themselves, while a blender and storage bin immediately following the grinding rolls are also employed. The equipment is enclosed to prevent the introduction of substantial amounts of air and the evolved grinder gas is removed by means of a rotary blower connected to the various collection points by a system of appropriate piping. A portion of the recovered grinder gas is recycled by introduction into the grinders along with the freshly roasted coffee beans. In this manner the intake of air into the system is reduced.

The grinder gas is then conveyed to a surface cooled to about $-195°$ C. with liquid nitrogen where it is condensed as a frost. This frost is removed from the condensing device by means of a suitable scraper and deposited in a stainless steel container which has been previously chilled to about $-78°$ C. The container is vented to the atmosphere to permit the carbon dioxide to purge the container of any oxygen present. The container is then sealed and stored at this temperature.

Following the above procedure, grinder gas is collected from freshly roasted coffee being ground to a medium particle size at the rate of 3400 pounds of coffee per hour. Gas is removed from the system at the rate of 24 cubic feet per minute of which 4 cubic feet per minute is recycled with the incoming roasted beans. Collection and condensation of grinder gases at this rate for one hour yields about 5700 gms. of frost. This frost is largely composed of carbon dioxide but also contains, as aforementioned, the aromatic constituents of grinder gas and a small amount of water vapor.

In the packaging operation a 2 ounce glass jar is filled to capacity with dry coffee extract and the air which amounts to from 190–200 cubic centimeters is removed therefrom by the application of a vacuum of 29.5 inches of mercury at standard conditions of temperature and pressure.

The grinder gas frost collected above is allowed to warm slightly in its container causing it to vaporize and create a fairly high pressure within said container. It is then released to the packaging system in controlled amounts. The packaging system includes an accumulator tank which acts as a reservoir of grinder gas under very slight pressure. The jar under vacuum is then exposed to the atmosphere of grinder gas and allowed to fill with the aroma. This process returns the jar and its contents to atmospheric pressure and it is thereafter immediately sealed and capped.

In this manner a jar of dry coffee extract is provided which on opening releases to the surrounding atmosphere the extremely pleasing aroma of freshly ground roasted coffee.

Although the present invention has been more particularly described with respect to the preferred coffee aroma source, namely that which is released during the process of grinding freshly roasted coffee beans, other types of coffee-aroma bearing gas can be employed and will benefit from the improved procedure of the present invention whenever they are condensed in a form where they will contain undesirable moisture and oxygen as well as unfavorable volatile coffee components. In general, the aroma source will be one which is derived during the production of roasted coffee products; examples of these are roaster gases as well as grinder gas, although the latter is the most preferred aroma source. In addition, however, that aroma which is recovered in the course of soluble coffee production may also be utilized inasmuch as it will contain many of those undesired components which contribute to instability. In addition to the coffee aroma sources recovered incidental to the production of roasted coffee or soluble coffee products, other coffee aroma sources may be advantageously treated and typical among these are those which are recovered by dry distillation of roasted coffee prior to grinding or during grinding as well as materials recovered by the introduction of steam to a bed of either whole or roasted and ground coffee, the steam serving to wet and extract volatile coffee components.

Moreover, although the present invention is most useful in the aromatization of a headspace or void space of a container of a soluble coffee product, it may also be employed to aromatize the headspace or void space of other roasted coffee products such as roasted and ground coffee. In view of the stability of the product after it has been vaporized and freed of the undesirable condensate residuum, the stable aroma product may be combined with a coffee or coffee like product by other means including incorporation of the stabilized aroma product into an aqueous extract of roasted and ground coffee as well as into an oleaginous extract of ground coffee (coffee oil) recovered by expression with a hydraulic press or similar apparatus as well as by means of solvent extraction, e.g., a process such as disclosed in U.S. 2,542,119 to Cole.

It will be understood that, while the invention has been described in part by means of specific examples, reference should be had to the appended claims for a definition of the scope of the invention.

What is claimed is:

1. A process for producing a stable coffee aroma product characterized by its improved storage stability which comprises collecting coffee-aroma bearing gas containing carbon dioxide, moisture and oxygen by condensing said gas as an aroma bearing frost, depositing said frost in a chilled container, tempering said frost by warming to about $-78°$ C. to vaporize carbon dioxide and oxygen contained therein so that the carbon dioxide purges the frost environment of oxygen by removing vaporized oxygen from the environment of said frost and thereafter vaporizing desirable coffee aroma components from said frost by heating said frost to a temperature of $-78°$ C. to $70°$ C. in the presence of vaporized carbon dioxide whereby said desirable coffee aroma components are separated in a more stable form from moisture, oxygen and undesirable aroma components occluded in the condensate residuum.

2. The process of claim 1 wherein said coffee-aroma bearing gas is grinder gas.

3. The process of claim 1 wherein said coffee-aroma bearing gas is roaster gas.

4. The process of claim 1 wherein said coffee-aroma bearing gas is that of infusion aroma.

5. The process of claim 1 wherein said coffee-aroma bearing gas is obtained by the dry distillation of coffee beans.

6. A process according to claim 2 wherein said frost is condensed at a temperature of about $-195°$ C., is tempered to a temperature of about $-78°$ C., and the desirable aroma components are vaporized at a temperature below $70°$ C. and above $-10°$ C.

7. A process according to claim 1 wherein said separated desirable aroma components are stored in an atmosphere of an inert gas.

8. A process according to claim 2 wherein said separated desirable aroma components are stored in an atmosphere of carbon dioxide.

9. A process of aromatizing the contents of a sealable container of dry coffee extract which has been vacuumized to withdraw air from the void space therein which comprises collecting coffee-aroma bearing gas containing carbon dioxide, oxygen and moisture by condensing said gas as an aroma bearing frost, tempering the aroma bearing frost by warming to a temperature of about $-78°$ C. to permit the oxygen in the air and carbon dioxide to become gaseous so that the carbon dioxide purges the frost environment of oxygen, introducing said condensed coffee-aroma bearing gas into said vacuumized container by heating said frost to a temperature of $-78°$ C. to $70°$ C. to vaporize desirable coffee aroma components and carbon dioxide and separating said vapors from the moisture, oxygen and undesirable aromatic components occluded in the condensate residuum, admitting the vapor product into said vacuumized container to at least partially fill the void space therein, and sealing the container with substantially all of the introduced coffee-aroma bearing gas retained therein.

10. A process of aromatizing the contents of a sealable container of dry coffee extract which has been vacuumized to withdraw air from the void space therein which comprises grinding roasted coffee, collecting the grinder gas produced thereby which contains desirable aromatic components, undesirable aromatic components, moisture, carbon dioxide and oxygen by condensing said grinder gas as a frost, tempering the aroma bearing frost by warming to about $-78°$ C., to permit the oxygen in the air and carbon dioxide to become gaseous so that the carbon dioxide purges the frost environment of oxygen, introducing said desirable aromatic components into said vacuumized container by heating the grinder gas condensate frost to $-10°$ C. to $70°$ C. to vaporize the coffee-aroma bearing gas and thereby separate it from the moisture and other undesirable aroma components occluded in the condensate residuum, admitting the vapor product to said vacuumized chamber to at least partially fill the void space therein, and sealing the container with substantially all of the introduced coffee-aroma-bearing gas retained therein.

11. A process according to claim 10 wherein the grinder gas is introduced into said container to provide a concentration of said gas in the atmosphere filling the void space of said container from 30–100%.

12. A process according to claim 10 wherein the volatile coffee aroma constituents produced in grinding the roasted coffee are collected by condensing them at a temperature at least at low as −78° C.

13. A process according to claim 10 wherein the volatile coffee aroma constituents produced in grinding the roasted coffee are collected by condensing them at the temperature of liquid nitrogen.

References Cited in the file of this patent

UNITED STATES PATENTS

| | | |
|---|---|---|
| 1,367,725 | Trigg | Feb. 8, 1921 |
| 1,992,556 | Tone | Feb. 26, 1935 |
| 2,156,212 | Wendt et al. | Apr. 25, 1939 |
| 2,306,061 | Johnston | Dec. 22, 1942 |
| 2,518,100 | Tomkins | Aug. 8, 1950 |
| 2,680,687 | Lemmonier | June 8, 1954 |